Figure 1:
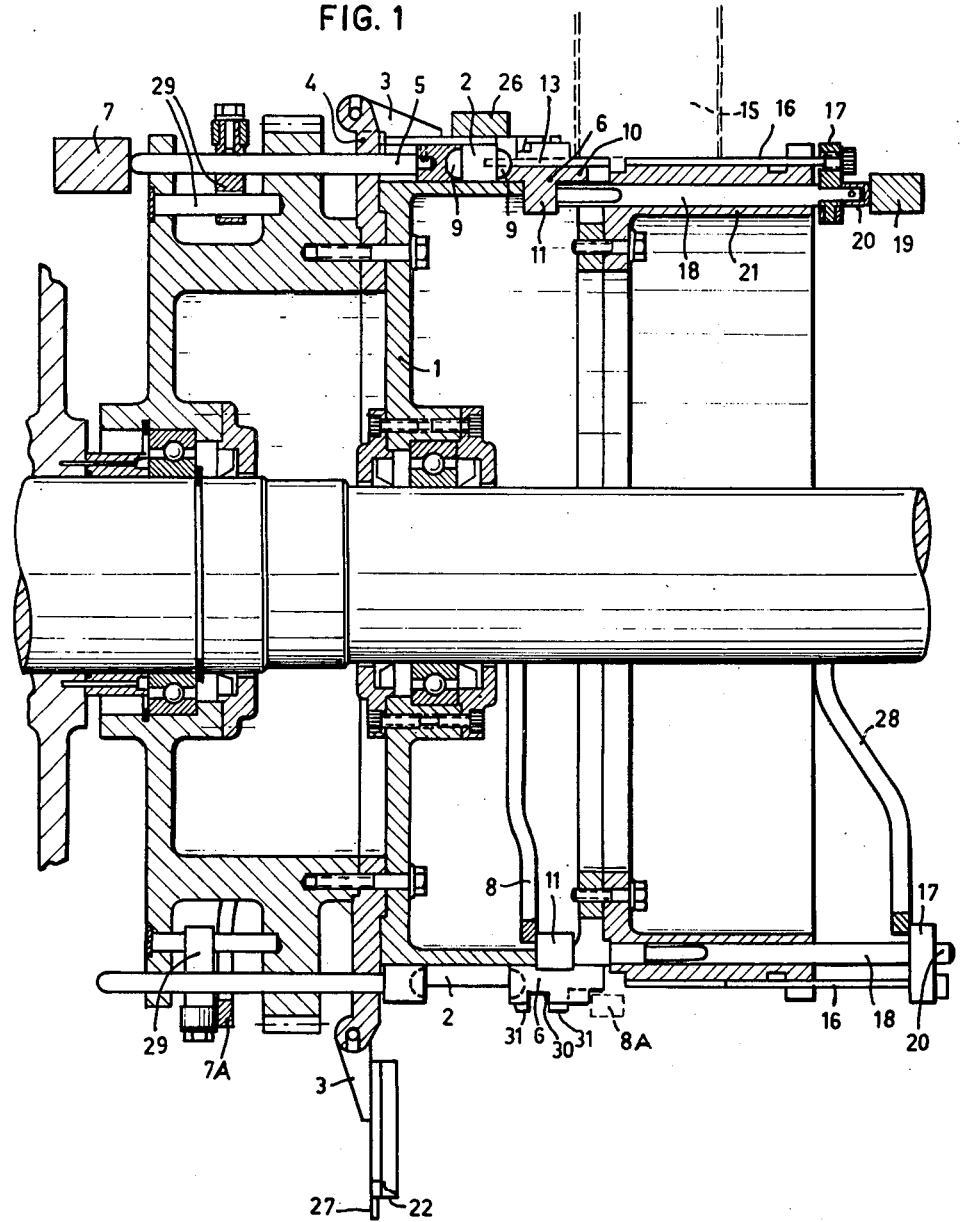

United States Patent [19]
Aquarius

[11] 3,879,162
[45] Apr. 22, 1975

[54] APPARATUS FOR MOULDING LOLLIPOPS

[76] Inventor: Conrardus Hubertus Aquarius, 13, Weert, Kanaalstraat, Netherlands

[22] Filed: Apr. 13, 1973

[21] Appl. No.: 350,736

[30] Foreign Application Priority Data
Apr. 18, 1972 Netherlands.......................... 005212

[52] U.S. Cl............... 425/517; 425/126 S; 425/519
[51] Int. Cl.............................................. A23g 3/12
[58] Field of Search............. 425/126 R, 126 S, 233, 425/521, 517, 519

[56] References Cited
UNITED STATES PATENTS
| 971,097 | 9/1910 | Woolf............................ 425/126 S |
| 3,541,973 | 12/1970 | Aquarius......................... 425/112 X |

FOREIGN PATENTS OR APPLICATIONS
91,633  2/1959  Netherlands........................ 425/126

*Primary Examiner*—Andrew R. Juhasz
*Assistant Examiner*—David S. Safran
*Attorney, Agent, or Firm*—Kurt Kelman

[57] ABSTRACT

In a known type of apparatus for moulding lollipops in a series of moulding cavities defined by respective pairs of moulding dies and associated recesses therebetween arranged annularly about the peripheral face of a rotatable moulding drum, and which comprises a mechanism for inserting, during rotation of the drum, one end of successive lollipop sticks through a longitudinal passage parallel to the rotary drum axis, the invention provides a radial slot in the peripheral wall of one series of the moulding dies to constitute the longitudinal passage. A single plate part fits into, and is movable into and out of, an associated one of the slots. The plate part leaves free a portion of the slot sufficient to permit insertion of the lollipop stick therethrough when it has been moved into the slot to close the moulding cavity. The slot length is such that, after the plate part has been moved out of the slot, a moulded lollipop together with the lollipop stick inserted thereinto is removable from the moulding cavity in a radial direction after the moulding die of the ones series has been retracted only over a distance necessary to release the sugar part of the lollipop from the moulding die.

3 Claims, 8 Drawing Figures

3,879,162

APPARATUS FOR MOULDING LOLLIPOPS

The invention relates to an apparatus for moulding lollipops from a continuously fed string of sugar, of the type known from U.S. Pat. 3,541,973. This type of apparatus is provided with a moulding drum rotatable about a central shaft, and having a series of recesses distributed over the outer peripheral face, thereof. Each recess together with two moulding dies, arranged in peripheral direction in two opposite series, delimit moulding cavities for the lollipops. The moulding dies of both series are movable towards and away from each other, in the associated recesses, in parallel to the axis of the moulding drum, and a mechanism is positioned at the periphery of the moulding drum which mechanism is adapted, when the moulding drum is rotating, to insert the one end of lollipop sticks received from a supply device into the moulding cavities through a longitudinal passage which extends in parallel to the axis of the moulding drum and through the moulding dies of one series and opens freely in the moulding cavity.

In the known apparatus, the longitudinal passage is a longitudinal bore enclosed on all sides by the material of the moulding die and formed in a short cylindrical portion of the moulding die. At the bottom of the moulding die each moulded lollipop drops out of the apparatus, in a radial direction and in parallel with the axis of the moulding drum, and this is achieved by the moulding dies with their longitudinal bore, being retracted so far beyond the free end of the lollipop sticks that the dies release the sticks completely.

The fact that the moulding dies which are provided with the longitudinal bore have to be retracted over the entire length of the lollipop sticks in order to have the moulded lollipops drop out of the moulding drum, is a disadvantage of the known apparatus, resulting in relatively large dimensions of the apparatus and having an adverse influence on the rate of production.

The object of the present invention is to provide improvements in an apparatus of the kind mentioned above which obviate this disadvantage.

The apparatus according to the invention is characterized in that the longitudinal passage is a radial slot which extends in the peripheral wall of the moulding die and, when moulding a lollipop, can be closed in respect of the moulding cavity by means of a plate portion, leaving free a portion of the slot, said portion being intended for the passage of a lollipop stick, and the width of the slot being at least equal to the diameter of the lollipop stick and having a length such that, after removal of the plate portion from the slot, a moulded lollipop together with its lollipop stick can be removed in a radial direction after the moulding die has been retracted over only the distance which is necessary to release the sugar part of the lollipop from the moulding die.

With this feature, it is no longer necessary that the moulding die be retracted over the full length of the lollipop stick, but only over the distance which is necessary to release the sugar portion of the lollipop from the moulding die.

A preferred embodiment of the apparatus according to the invention, just as the apparatus according to the above-mentioned patent is provided with pivotal flaps which also delimit the moulding cavities and cut successive pieces from the sugar string, when the moulding dies have been moved away from each other. The flaps press these pieces into the recesses, and each flap covers two adjacent halves of two adjacent recesses. According to this preferred embodiment the plate portion extends downwards from the one side of each flap over a distance which is equal to the radial distance over which the slot is to be closed, and the plate portion is attached to that one side so that one half of its thickness projects outside this one side, and the other half of its thickness lies in a first notch which is provided on the one side, and the other side of each flap is provided with a second notch of the same size as the first notch, the second notch being adapted to receive the projecting half of the plate portion of each adjacent flap.

Preferably the slot extends according to a radial plane of the moulding die such that, when the moulding die is at the lowest point of the rotatable moulding drum, the slot is directed radially downwards and outwards. Then the moulded lollipops drop out the moulding drum by gravity.

With reference to the drawing a preferred embodiment of the apparatus according to the invention is further described.

FIG. 1 is a vertical longitudinal section of the apparatus.

Figure 2:
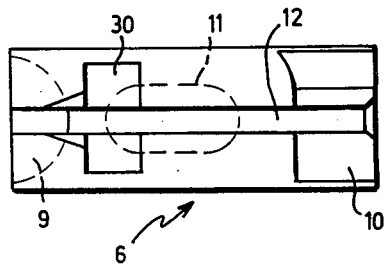
Figure 3:
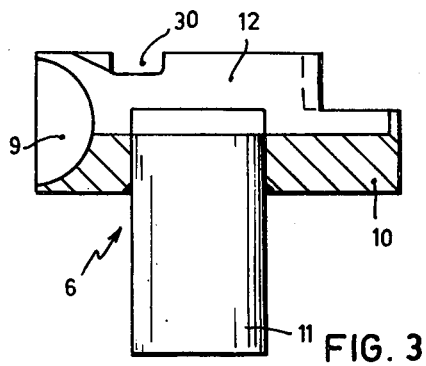
Figure 4:
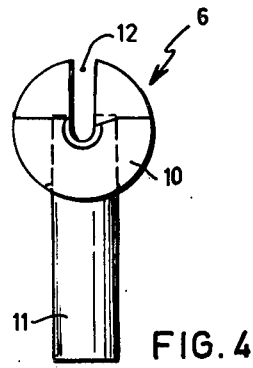

FIGS. 2, 3 and 4, respectively, show a top plan view, a longitudinal section and an end view of a slotted moulding die according to the invention.

Figure 5:
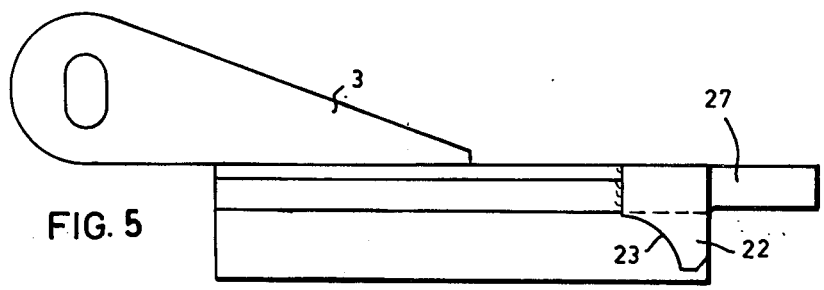
Figure 6:
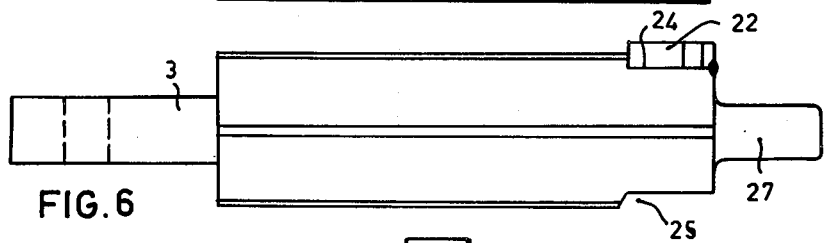
Figure 7:
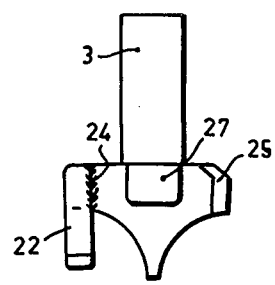

FIGS. 5, 6 and 7, respectively, show a side view, a bottom view and an end view of a pivotable flap including a plate portion that can be inserted into the slot.

Figure 8:
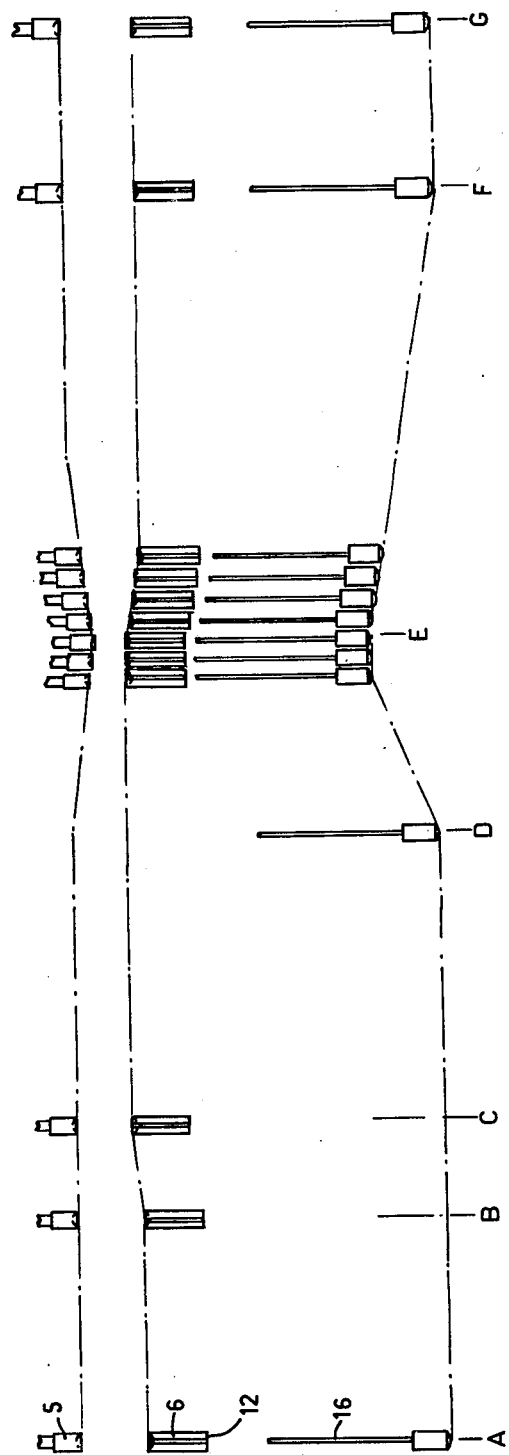

FIG. 8 is a diagrammatic representation of the displacement of a few moulding dies by means of a guide curve.

The apparatus has an externally driven moulding drum 1 which is rotatable around a horizontal central shaft. At the cylindrical outer peripheral face of the drum, a series of recesses 2 is provided and pivotable flaps 3 are mounted adjacent thereto. The flaps are pivotally connected with the periphery of a ring 4 forming part of the moulding drum. The flaps are provided with cavities (FIG. 7) complementing recesses 2 to impart the desired profile to the lollipops. The moulding dies 5 and 6 are positioned in parallel to the axis of the moulding drum about the periphery thereof in two series adjacent recesses 2. The moulding dies can be moved towards and away from each other in the recesses 2, in parallel to the axis of the moulding drum. Each series of dies has its own movement mechanism for this purpose, which will be described below.

At its end face lying in the moulding cavity defined by associated recess 2, each moulding die is provided with hemispherical recess 9 in accordance with the shape which is to be given to the end faces of the lollipops.

The reciprocating movements of the series of moulding dies 5 and 6 are controlled by guide curves. The guide curves for the moulding dies 5 are indicated by 7 and 7A. The guide curves for the series of moulding dies 6 are indicated by 8 and 8A. In fact, each moulding die 6 consists of a relatively short cylindrical body (FIGS. 2–4), with front end recess 9, and a semi-cylindrical rear end 10. Lug 11 extends downwards from die 6 intermediate the ends thereof. A longitudinal passage extends through the upper half of each moulding die. This passage has the form of a slot 12 which is directed radially outwards from the centre of the body of the moulding die, and which slot opens into the peripheral wall of the moulding die. This slot extends over the entire length of the moulding die and, consequently, is in communication with the recess 9. The width of the slot 12 is at least equal to the diameter of the lollipop sticks 13. The bottom of the slot (FIG. 4) is semi-circular, in accordance with the diameter of the lollipop sticks. The slot 12 is continued into the upper face of the rear end 10, namely as a semicircular groove open at the top.

The slot 12 and the latter groove guide each lollipop stick to the moulding cavity defined by the recesses 2. The lollipop sticks come from a funnel-shaped supply tray 15 positioned at the periphery of the moulding drum. When the moulding drum rotates, the sticks are pressed one by one into the moulding cavities, in an axial direction through the slot 12, while the sticks lie on the bottom of the slot 12. The forward movement and the insertion of the lollipop sticks is effected by means of a pressure pin 16 which is coupled with a guide shaft 18 by means of coupling 17. The shaft 18 can be axially displaced by curve 19 cooperating with the head 20 of the guide shaft 18. The opposite end of the guide shaft 18 bears against a side of big 11 of the moulding die 6. The diameter of the pressure pin 16 substantially corresponds with the diameter of the lollipop sticks 13 so that the pressure pin is adapted to press the lollipop stick into the slot 12. From the funnel 15 the lollipop sticks drop into axial grooves at the periphery of the sticks receiving drum which is co-rotatably coupled with the medium drum 1. The grooves in the sticks receiving drum and the slots 12 are axially aligned so that the pressure pin 16 will press the sticks into the slots without any difficulty.

FIG. 1 shows that, in the formed position of the moulding die 6, the rear end 10 is moved to below the sticks funnel 15. The advantage is that the left end of each stick which drops out of the funnel 15 is directly received within the groove that is provided in the flat upper face of the rear end 10. Consequently, from the beginning each lollipop stick is partially supported by the moulding die 6, and this means that the foremost end of the lollipop stick needs not first be transferred from the groove in the stick receiving drum to the bottom of the slot 12. This is beneficial to the smooth displacement of the lollipop sticks into the direction of the moulding cavity.

Since the slot 12 normally is radially open to the outside and to the recess 9, provisions must be made which prevent that during the moulding of the lollipop, i.e. during the compression of the sugar mass, sugar escapes to the outside through slot 12. In order to close the slot 12 in respect of the moulding cavity during the pressing action, the one longitudinal side of each flap 3 is provided with a plate portion 22. The width of this plate portion corresponds with the width of the slot 12, and the rear side 23 of the plate portion has a form which is similar to the wall of the recess 9. The plate portion extends downwards from the one longitudinal side of the flap, over a distance which is equal to the radial distance over which the slot 12 is to be closed when a lollipop is moulded. The distance is such that, when the plate portion 22 has been introduced into the slot (which position is represented at the top of FIG. 1), there will be a free longitudinal passage for a lollipop stick at the bottom of the slot 12.

Since the represented apparatus is provided with pivoting flaps severing successive pieces from the string of sugar and pressing them into the recesses 2 and each, in closed position, covering two adjacent halves of two adjacent recesses, the plate portion 22 is attached to the one longitudinal side of the flap 3 so that the one half of the thickness of the plate, and the other half of its thickness lies in the notch 24 formed in the side. The other longitudinal side of the flap is provided with a notch 25 which corresponds with the notch 24 and is adapted to receive the half of the plate portion 22 that projects outside each adjacent flap.

It will be clear from what is said above, that a moulded lollipop can be released from the moulding drum without it being necessary that the moulding dies 6 be retracted to beyond the free end of the lollipop sticks. As soon as the pivoting flaps 3 reach the bottom of the moulding drum 1 and, consequently, are pivoted to their open position (FIG. 1) the slot 12 is opened since the plate portion 22 falls away from it. The only thing to be done is to retract the moulding dies over the slight distance which is necessary to release the sugar portion of the moulded lollipop from the recess 9. When this is done, the moulding lollipop freely drops downwards from the moulding drum. For the rest, the operation of the apparatus, essentially corresponds with the operation of the apparatus according to the above cited patent.

Just as the known apparatus the apparatus according to the invention comprises a pressure curve 26 for the pivoting flaps 22 which pressure curve acts on the flap edge 27 so as to maintain the flaps in a closed condition. Furthermore, each die 6 comprises a transverse groove 30 which is perpendicular to the slot 12 and is positioned at the outwardly faced side of the die 6, at a short distance behind the recess 9. Through this groove or recess 30 a curve (not represented) extends which aids in the opening of the flap 3. It appears particularly from FIG. 1 that this transverse groove 30, in the retracted position of the moulding die 6, coincides with the peripheral groove in the drum (inner body) 1, which peripheral groove is defined by two peripheral ribs 31.

Finally, FIG. 8 will be elucidated. In their retracted positions the moulding dies 5 and 6 of each pair are in position A. In this position the dies are at the bottom of the moulding drum 1, i.e. the position in which the slot 12 extends according to a radial plane such that the slot is directed radially downwards and outwards and the moulded lollipop automatically drops away from the drum. While the rotation of the drum is continued, the dies 5 and 6 initially maintain the same mutual distance over the range A–B. Thereupon, the die 6 is forced a bit forwards into the direction of the die 5, over the range B-C, which position is maintained up to point D, whereupon the pressure pin 16 starts pressing lollipops stick forwards and also the mutual distance between the dies is reduced because the moulding die 5 is displaced towards the die 6 up to, finally, the pressure position E has been reached, whereupon the dies again move away from each other, because they both move backwards. The dropping range of the moulded lollipops is indicated by F–G.

The invention is not restricted to the embodiment described and represented but comprises all variants within the scope claimed.

What is claimed is:

1. In an apparatus for moulding lollipops from a continuously fed string of sugar, which comprises a moulding drum, a central shaft about which the drum is rotatable, the moulding drum having a peripheral face defining a series of recesses distributed annularly over the peripheral face, two annularly arranged series of moulding dies positioned on the peripheral drum face on either side of the recesses, respective pairs of the moulding dies defining a moulding cavity with an associated one of the recesses, the moulding dies being reciprocable into and out of the associated recesses in a direction parallel to the shaft, a supply of lollipop sticks, and a mechanism positioned at the peripheral drum face for inserting, during rotation of the drum, one end of successive lollipop sticks received from the supply into successive moulding cavities through a longitudinal passage extending parallel to the shaft in each of the moulding dies of one series of dies and opening into the moulding cavity: the moulding dies of the one series each having a peripheral wall defining a radial slot constituting the longitudinal passage, and further comprising a single plate part fitting into, and movable into and out of, an associated one of the slots, the plate part being dimensioned to leave free a portion of the slot sufficient to permit insertion of the lollipop stick therethrough when the plate part has been moved into the slot and thus closes the moulding cavity, and the length of the slot being such that, after the plate part has been moved out of the slot, a moulded lollipop together with the lollipop stick inserted thereto is removable from the moulding cavity in a radial direction after the moulding die of the one series has been retracted only over a distance necessary to release the sugar part of the lollipop from the moulding die.

2. In the apparatus of claim 1, which includes a series of pivotal flaps bounding the moulding cavities and arranged to sever successive pieces from the string of sugar upon reciprocation of the moulding dies away from each other and to press the pieces into the recesses, each of the flaps extending over adjacent halves of two adjacent ones of the recesses, each of the plate parts extending downwardly from, and being attached to, one side of a respective one of the flaps over a distance equal to the radial distance over which the plate part is to be moved into the associated slot, one half of the thickness of the plate part projecting laterally from the one flap side and the other half of the thickness of the plate part lying in a first notch defined in the one flap side, the other side of each flap defining a second notch of the same size as the first notch, and the second notch being arranged to receive the projecting one half of the plate part of each adjacent flap.

3. In the apparatus of claim 1, wherein the slot extends in a radial plane of the moulding drum.

* * * * *